United States Patent
I et al.

(10) Patent No.: US 10,066,104 B2
(45) Date of Patent: Sep. 4, 2018

(54) POLYAMIDE RESIN COMPOSITION, POLYAMIDE RESIN COMPOSITION PELLET GROUP, MOLDED ARTICLE, AND METHOD FOR PRODUCING A POLYAMIDE RESIN COMPOSITION

(71) Applicant: ASAHI KASEI KABUSHIKI KAISHA, Tokyo (JP)

(72) Inventors: Shunichiro I, Tokyo (JP); Norio Sakata, Tokyo (JP); Katsushi Watanabe, Tokyo (JP); Tetsuo Kurihara, Tokyo (JP)

(73) Assignee: ASAHI KASEI KABUSHIKI KAISHA, Tokyo (JP)

(*) Notice: Subject to any disclaimer, the term of this patent is extended or adjusted under 35 U.S.C. 154(b) by 16 days.

(21) Appl. No.: 15/310,260

(22) PCT Filed: Dec. 25, 2015

(86) PCT No.: PCT/JP2015/006486
§ 371 (c)(1),
(2) Date: Nov. 10, 2016

(87) PCT Pub. No.: WO2016/103733
PCT Pub. Date: Jun. 30, 2016

(65) Prior Publication Data
US 2017/0267861 A1    Sep. 21, 2017

(30) Foreign Application Priority Data
Dec. 26, 2014 (JP) .................................. 2014-266042

(51) Int. Cl.
*C08L 77/06*       (2006.01)
*C08K 3/10*        (2018.01)

(52) U.S. Cl.
CPC ......... *C08L 77/06* (2013.01); *C08L 2205/025* (2013.01)

(58) Field of Classification Search
CPC .. C08K 3/105; C08K 3/10; C08K 3/16; C08L 77/06
See application file for complete search history.

(56) References Cited

U.S. PATENT DOCUMENTS

| 9,493,611 | B2 * | 11/2016 | Masunaga | ............... C08L 77/02 |
| 2007/0293607 | A1 * | 12/2007 | Arakawa | ................. C08K 7/14 |
| | | | | 524/100 |
| 2008/0152885 | A1 | 6/2008 | Miyoshi et al. | |
| 2016/0222196 | A1 * | 8/2016 | Kawamura | ............. C08K 3/22 |

FOREIGN PATENT DOCUMENTS

| JP | H01-284525 A | 11/1989 |
| JP | H01-284526 | 11/1989 |
| JP | H03-167221 A | 7/1991 |
| JP | H04-050260 A | 2/1992 |
| JP | H06-128479 A | 5/1994 |
| JP | H06-128480 A | 5/1994 |
| JP | H09-169903 A | 6/1997 |
| JP | H09-227173 A | 9/1997 |
| JP | 2006-152018 A | 6/2006 |
| JP | 2007-302903 A | 11/2007 |
| JP | 2008-247984 A | 10/2008 |
| JP | 2010270327 A | 2/2010 |
| JP | 2011-012151 A | 1/2011 |
| WO | 2006/054774 A1 | 5/2006 |

OTHER PUBLICATIONS

International Search Report and International Search Opinion issued with respect to Application No. PCT/JP2015/006486, dated Mar. 8, 2016.
Supplementary European Search Report from Application No. 15872304.9 dated Sep. 5, 2017.
Written Opinion of International Searching Authority issued with respect to Patent Application No. PCT/JP2015/006486 dated Aug. 3, 2016.

* cited by examiner

*Primary Examiner* — Rip A Lee
(74) *Attorney, Agent, or Firm* — Greenblum & Bernstein, P.L.C.

(57) ABSTRACT

The object is to provide a polyamide resin composition having superior productivity and mechanical strength. A polyamide resin composition includes: (A) Polyamide 66; (B) glass fibers; and (C) a copper compound and a halide. The percentage of a component of the (A) Polyamide 66 having a molecular weight of 30,000 or less as obtained by Gel Permeation Chromatography (GPC) is within a range from 30% by mass to 37% by mass of the total amount of the (A) Polyamide 66, and the percentage of the (A) Polyamide 66 having a molecular weight of 100,000 or greater is within a range from 8% by mass to 15% by mass of the total amount of the (A) Polyamide 66.

16 Claims, No Drawings

POLYAMIDE RESIN COMPOSITION, POLYAMIDE RESIN COMPOSITION PELLET GROUP, MOLDED ARTICLE, AND METHOD FOR PRODUCING A POLYAMIDE RESIN COMPOSITION

CROSS REFERENCE TO RELATED APPLICATIONS

The present application is a National Stage of the PCT International Application No. PCT/JP2015/006486 filed on Dec. 25, 2015, which claims priority under 35 U.S.C. § 119(a) to Japanese Patent Application No. 2014-266042 filed on Dec. 26, 2014. Each of the above applications is hereby expressly incorporated by reference, in its entirety, into the present application.

BACKGROUND

The present disclosure is related to a polyamide resin composition, a polyamide resin composition pellet group, a molded article, and a method for producing a polyamide resin composition.

Polyamide resins and polyester resins are used in various industrial fields because they have superior mechanical properties (mechanical strength, rigidity, impact resistance, etc.). Among such resins, Polyamide 66 is often employed as a composition which is complexed with inorganic fillers such as glass fibers, glass flakes, alumina fibers, and layered inorganic compounds, for the purpose of increasing the molecular weight as well as the mechanical properties and the sliding properties thereof, compared to normal Polyamide 66 for molding. Of these, glass fiber reinforced polyamide resin compositions that employ glass fibers as the inorganic filler are being focused on due to the high mechanical property improving effects thereof. Generally, glass fibers having the surfaces thereof processed with a glass fiber sizing agent such as a silane coupling agent and a film forming agent in order to obtain favorable interface states when complexed with polyamide, are utilized.

For example, Japanese Unexamined Patent Publication No. H6-128479 discloses a technique that complexes glass fibers, the surfaces of which have been processed with a glass fiber sizing agent having a copolymer of maleic anhydride and unsaturated monomer and a silane series coupling agent as its main components, with polyamide to improve antifreeze liquid resistance. Further, Japanese Unexamined Patent Publication No. H9-227173 discloses a technique that improves the water resistance of the surfaces of glass fibers and a polyamide resin, employing a polycarbodiimide resin, a polyurethane resin, or a silane coupling agent. Further, Japanese Unexamined Patent Publication No. H6-128480 discloses a Polyamide 66 resin composition that includes polyamide having a specific relative viscosity in sulfuric acid and glass fibers. International Patent Publication No. WO 2006/054774 discloses a polyamide resin composition that includes Polyamide 66 having a specific number average molecular weight, glass fibers, copper compounds, potassium halides, and melamine.

SUMMARY

Polyamide resin compositions that employ high molecular weight Polyamide 66 are known as those having high mechanical strength improving effects. However, there is a tendency for the resin temperature to become high during melt kneading, and therefore the resulting pellets frequently contain bubbles which are considered to be generated by dissolved gas entering the resin to cause foaming, and also frequently have fluctuations in physical properties. In addition, during melt kneading of polyamide resin compositions that include high molecular weight Polyamide 66, there is a problem that a large fluctuation range of torque in extruding apparatuses and the like. Such a problem may influence productivity, and therefore improvements are desired. In addition, in applications for the automotive industry and for industrial parts, there is growing demand with respect to the shapes of molded products, such as larger sizes and thinner articles. It is necessary for mechanical strength and the quality of pellets to be superior in order to favorably and stably produce such molded products. However, it had been difficult to achieve these objectives at high levels in cases that high molecular weight Polyamide 66 was employed.

The present disclosure has been developed in view of the foregoing circumstances. The present disclosure provides a polyamide resin composition having superior productivity and mechanical strength, a polyamide resin composition pellet group, a molded article obtained by molding the composition, and a method for producing such a polyamide resin composition.

As a result of intensive studies to solve the above problem, the present inventors discovered that a polyamide resin composition that satisfies predetermined conditions and includes glass fibers can solve the above problem, thereby achieving the present disclosure.

That is, the polyamide resin composition of the present disclosure is a polyamide resin composition comprising:
(A) Polyamide 66;
(B) glass fibers; and
(C) a copper compound and a halide;
characterized by the percentage of a component of the (A) Polyamide 66 having a molecular weight of 30,000 or less as obtained by Gel Permeation Chromatography (GPC) being within a range from 30% by mass to 37% by mass of the total amount of the (A) Polyamide 66, and the percentage of the (A) Polyamide 66 having a molecular weight of 100,000 or greater being within a range from 8% by mass to 15% by mass of the total amount of the (A) Polyamide 66.

It is preferable for the average fiber diameter of the (B) glass fibers to be within a range from 5 µm to 9 µm.

It is preferable for the (A) Polyamide 66 to include at least one type of Polyamide 66 (A-1) having a relative viscosity RV of 65 or greater and 250 or less, and at least one type of Polyamide 66 (A-2) having a relative viscosity R of 25 or greater and less than 65.

It is preferable for the mass ratio (A-1)/(A-2) of Polyamide 66 (A-1) and Polyamide 66 (A-2) to be within a range from 85/15 to 50/50.

It is preferable for the polyamide resin composition to comprise 100 parts by mass of the (A) Polyamide 66, 1 to 100 parts by mass of the (B), and 0.005 to 1 part by mass of the (C) copper compound and halide.

It is preferable for the concentration [Cu] of copper with respect to the (A) Polyamide 66 to be 40 ppm or greater and 300 ppm or less.

It is preferable for the concentration [X] of halogen with respect to the (A) Polyamide 66 to be 40 ppm or greater and 9000 ppm or less.

It is preferable for the molar ratio (halogen/copper) of the halogen content and the copper content to be within a range from 2/1 to 50/1.

It is preferable for the standard deviation of tensile strength of the polyamide resin composition of the present disclosure as measured according to ISO 527 to be 0.50 or less.

In addition, it is preferable for the standard deviation of tensile elongation of the polyamide resin composition of the present disclosure as measured according to ISO 527 to be 0.08 or less.

A polyamide resin composition pellet group of the present disclosure is an aggregate of pellets of the polyamide resin composition of the present disclosure, in which the standard deviation of the tensile strength as measured according to ISO 527 is 0.50 or less.

In addition, it is preferable for the standard deviation of the tensile elongation of the polyamide resin composition pellet group of the present disclosure as measured according to ISO 527 to be 0.08 or less.

A method for producing a polyamide resin composition of the present disclosure is a method for producing the polyamide resin composition of the present disclosure described above, and is characterized by comprising the steps of: (14) melting and kneading (A) polyamide 66 and (C) a copper compound and a halide at a melt kneading temperature of 300° C. or greater and 330° C. or less to obtain a kneaded product; and (1-2) adding (B) glass fibers to the kneaded product obtained by step (1-1) and performing further melt kneading.

A molded article of the present disclosure is obtained by molding the polyamide resin composition of the present disclosure.

The polyamide resin composition of the present disclosure is a polyamide resin composition comprising: (A) Polyamide 66; (B) glass fibers; and (C) a copper compound and a halide, which is characterized by the percentage of a component of the (A) Polyamide 66 having a molecular weight of 30,000 or less as obtained by Gel Permeation Chromatography (GPC) being within a range from 30% by mass to 37% by mass of the total amount of the (A) Polyamide 66, and the percentage of the (A) Polyamide 66 having a molecular weight of 100,000 or greater being within a range from 8% by mass to 15% by mass of the total amount of the (A) Polyamide 66. Therefore, a polyamide resin composition, in which foaming within pellets is suppressed and which is superior in productivity and mechanical strength, can be provided.

DETAILED DESCRIPTION OF THE PREFERRED EMBODIMENTS

The present disclosure will be described in detail below.
[Polyamide Resin Composition]

The polyamide resin composition of the present disclosure is a polyamide resin composition comprising: (A) Polyamide 66; (B) glass fibers; and (C) a copper compound and a halide, which is characterized by the percentage of a component of the (A) Polyamide 66 having a molecular weight of 30,000 or less as obtained by Gel Permeation Chromatography (GPC) being within a range from 30% by mass to 37% by mass of the total amount of the (A) Polyamide 66, and the percentage of the (A) Polyamide 66 having a molecular weight of 100,000 or greater being within a range from 8% by mass to 15% by mass of the total amount of the (A) Polyamide 66.

Each component of the polyamide resin composition of the present disclosure will be described in detail below.
((A) Polyamide 66)

(A) Polyamide 66 (hereinafter, also referred to simply as "Polyamide 66" or "component (A)") is a polymer having amide bonds (—NHCO—) within the backbone thereof, and is constituted by hexamethylene units and adipic acid units. Polyamide 66 is not particularly limited, and examples include a polymer obtained by polycondensing hexamethylene diamine and adipic acid, a polymer obtained by polycondensing 6-aminocapronitrile and adipic acid, and a polymer obtained by polycondensing hexamethyenediamine and adipoyl chloride, and a polymer obtained by polycondensing, 6-aminocapronitrile and adipoyl chloride. Among these examples, the polymer obtained by polycondensing hexamethylene diamine and adipic acid is preferable due to the easy availability of raw materials. Note that Polyamide 66 is a resin containing 95 mol % or greater of Polyamide 66 out of a total of 100 mol %.

"Polyamide 66" includes homopolymers of polyamide 66, and copolymers of monomers which are capable of copolymerizing with Polyamide 66. The copolymerizable monomers are not particularly limited, and examples include polyamide components other than the Polyamide 66 component, for example polymerizable amino acids, polymerizable lactams, or other polymerizable diamines and dicarboxylic acids. Further, it is possible to add a known compound in order to adjust the molecular weight or to improve hot water resistance. Such a compound is not particularly limited, and examples include monocarboxylic acids, monoamines, acid anhydrides such as phthalic anhydride, monoisocyanates, monoacid halides, monoesters, and monoalcohols. Among these examples, monocarboxylic acids or monoamines are preferable.

It is preferable for the (A) Polyamide 66 to include at least one type of Polyamide 66 (A-1) (hereinafter, also referred to simply as "(A-1) component") having a relative viscosity RV of 65 or greater and 250 or less, more preferable for the (A) Polyamide 66 to include at least one type of Polyamide 66 (A-1) having a relative viscosity RV of 70 or greater and 230 or less, and even more preferable for the (A) Polyamide 66 to include at least one type of Polyamide 66 (A-1) having a relative viscosity RV of 75 or greater and 200 or less. There is a tendency for the mechanical properties of the obtained polyamide resin composition to improve by including such a Polyamide 66 (A-1). A single type of Polyamide 66 (A-1) may be employed, or two or more types may be employed in combination. Note that the relative viscosity RV may be measured by the method described in connection with the Examples.

In addition, it is preferable for the (A) polyamide 66 to include at least one type of Polyamide 66 (A-2) (hereinafter, also referred to simply as "(A-2) component") having a relative viscosity RV of 25 or greater and less than 65, more preferable for the (A) polyamide 66 to include at least one type of Polyamide 66 (A-2) having a relative viscosity RV of 27 or greater and 60 or less, and even more preferable for the (A) polyamide 66 to include at least one type of Polyamide 66 (A-2) having a relative viscosity RV of 30 or greater and 55 or less. Extrusion processing properties can be improved and a decrease in the molecular weight of the obtained polyamide resin composition can be suppressed, by including such a Polyamide 66 (A-2). A single type of Polyamide 66 (A-2) may be employed, or two or more types may be employed in combination.

It is preferable for the (A) Polyamide 66 to include both the Polyamide 66 (A-1) and the Polyamide 66 (A-2). There is a tendency for a balance of fluidity and long term characteristics to become superior by adopting this configuration. From the viewpoint of suppressing foaming in pellets, it is preferable for the mass ratio ((A-1)/(A-2)) of the (A-1) component and the (A-2) component to be within a range from 85/15 to 50/50, more preferably a range from 80/20 to 50/50, and even more preferably a range from 75/25 to 50/50.

The polymerization method of the Polyamide 66 is not particularly limited, and examples include a hot melt polycondensation method, a solid phase polymerization method, and a solution method. In the hot melt polycondensation, anti foaming agents are added as necessary to hexamethylene adipamide, which is a raw material of polyamide 66, and the hexamethylene adipamide is concentrated under heat at a temperature within a range from 40° C. to 300° C. Generated water vapor pressure is maintained at a pressure between atmospheric pressure and 20 atm. The pressure is ultimately vented to achieve polycondensation. In addition, the solid phase polymerization method is a method in which polymerization is performed at a temperature below the melting point of diamine or dicarboxylic acid salt solid salt to achieve polycondensation. Further, the solution method is a method for polycondensing a dicarboxylic acid halide component and a diamine component in a solution. These methods may be combined as necessary. The polymerization mode may be in a batch format or a continuous format. A polymerization apparatus is also not particularly limited, and examples include an autoclave reactor, a tumbler type reactor, an extruder reactor or kneader and the like.

In order to obtain a Polyamide 66 having a predetermined relative viscosity RV, general methods, such as a method of adjusting the polymerization time in the above hot melt polycondensation method and a method of solid-phase polymerization below the melting point of the polycondensate may be utilized, and the specific method is not particularly limited.

The terminal amino group concentration [NH$_2$] of the (A) Polyamide 66 is preferably 10 meq/kg or greater and 100 meq/kg or less, more preferably 20 meq/kg or greater and 90 meq/kg or less, and even more preferably 30 meq/kg or greater and 80 meq/kg or less. By the terminal amino group concentration being within the above range, the color tone of the polyamide resin composition will be superior, and there will be a tendency for yellowing due to deterioration to be suppressed. As an example of the method for measuring the terminal amino group concentration, there is that in which a predetermined amount of a Polyamide 66 sample is dissolved in a 90% aqueous phenol solution, titrated in 1/50 N hydrochloric acid at 25° C., and the terminal amino group concentration is calculated.

The terminal carboxyl group concentration [COOH] of the (A) Polyamide 66 is preferably 10 meq/kg or greater and 150 meq/kg or less, more preferably 20 meq/kg or greater and 140 meq/kg or less, and even more preferably 30 meq/kg or greater and 130 meq/kg or less. By the terminal carboxyl group concentration being within the above range, there is a tendency for the appearance of a molded article of the polyamide resin composition to become superior. As an example of the method for measuring the terminal carboxyl group concentration there is that in which a predetermined amount of Polyamide 66 sample is dissolved in benzyl alcohol at 160° C., utilizing phenolphthalein as an indicator in a 1/10 prescribed potassium hydroxide ethylene glycol solution, titrated, and the terminal carboxyl group concentration is calculated. Examples of the items of evaluation of the appearance of molded articles include roughness due to exposure of glass fiber, smoothness, and silver streaks, but the items of evaluation are not limited thereto.

The percentage of the terminal carboxyl group concentration (terminal carboxyl group ratio percentage) with respect to the sum of the terminal carboxyl group concentration [COOH] and the terminal amino group concentration [NH$_2$] of (A) Polyamide 66 is preferably within a range from 55% to 85%, more preferably a range from 57% to 80%, and even more preferably a range from 60% to 75%. By the terminal carboxyl group ratio being within the above range, there is a tendency for color tone stability to become superior and for the degree of long term yellowing to become small.

<Molecular Weight of Polyamide 66 within the Composition>

The Polyamide 66 which is employed in the polyamide resin composition of the present disclosure has specific amounts of components having molecular weights of 30,000 or less and components having molecular weights of 100,000 or greater. Thereby, sufficiently high fluidity can be exhibited during melt processing, high mechanical properties and wear properties can be maintained, and further, the quality of obtained pellets thereof can be improved. As specific amounts of the components, it is preferable for the components having molecular weights of 30,000 or less to be within a range from 30% by mass to 37% by mass with respect to the total amount of the Polyamide 66 from the viewpoints of fluidity and suppressing foaming in pellets, and for the components having molecular weights of 100,000 or greater to be within a range from 8% by mass to 15% by mass, and more preferably a range from 8% by mass to 14% by mass with respect to the total amount of the Polyamide 66 from the viewpoints of mechanical properties and wear properties.

It is preferable to use a different the aforementioned Polyamide 66 (A-1) and Polyamide 66 (A-2) having different molecular weighs, in order to set the molecular weights of the Polyamide 66 within the polyamide resin composition to the specific amounts. There is a tendency for resin temperature to rise during extrusion if a high molecular weight polyamide material is included. Therefore, it is preferable for a melt kneading temperature to be set to 330° C. or less.

The molecular weight of the polyamide 66 can be obtained by measurement using gel permeation chromatography (GPC). In the measurement, "HLC-8320GPC" manufactured by Tosoh Corporation was employed as the apparatus, a differential refractometer (RI) was employed as the detector, hexafluoroisopropanol containing 0.1 mol % of dissolved sodium trifluoroacetate (HFIP) was employed as the solvent, two "TSKgel-GMHHR-M" and one "G1000HHR" manufactured by Tosoh Corporation were employed as the columns. The sample concentration was 1 to 3 (mg sample)/1 (mL solvent), and the sample was filtered through a filter to remove insolubles to obtain a measurement sample. The molecular weight of the Polyamide 66 was calculated by polymethylmethacrylate (PMMA) conversion based on the obtained elution curve.

((B) Component: Glass Fibers)

The (B) Glass fibers (hereinafter, also simply referred to as "glass fibers" or "component (B)") function to impart superior mechanical strength, rigidity, and formability to the polyamide resin composition. The (B) glass fibers are not particularly limited as long as they are those which are generally utilized with polyamides.

The average fiber diameter of the (B) glass fibers is not particularly limited. However, it is preferable for the average fiber diameter to be within a range from 4 μm to 30 μm, more preferably a range from 5 μm to 9 μm, and particularly preferably a range from 5 μm to 8 μm. There is a tendency for superior mechanical strength, stiffness, and moldability to be imparted to the polyamide resin composition, by the average fiber diameter being within the above range.

Further, the form of the glass fiber is not particularly limited. Chopped strands, roving, milled fibers and the like may be employed. In addition, the weight average fiber length of the (B) glass fibers is not particularly limited, and a weight average fiber length may be selected as appropriate from within a range from 0.1 mm to 6 mm in the case that chopped strands are employed. Note that the average fiber diameter and the weight average fiber length in the present specification are average values of values obtained by measuring the diameters and lengths of 500 fibers which are randomly selected.

The amount of (B) glass fibers included in the polyamide resin composition is within a range from 1 to 100 parts by mass, preferably a range from 5 to 80 parts by mass, and more preferably a range from 10 to 50 parts by mass, with respect to a 100 parts by mass of the (A) Polyamide 66. If the amount of glass fibers is within the above range, the resin temperature may be maintained low, and pellets in which foaming is suppressed and/or a resin composition in which fluctuations are suppressed can be obtained (the advantageous effects are not limited to these).

A conventional known sizing agent may be adhered to the surfaces of the (B) glass fibers. The sizing agent is not particularly limited, and examples include copolymers of maleic anhydride with an unsaturated monomer, silane coupling agents, and those having acrylic acid copolymers and/or urethane polymers as principal components thereof. Among these examples, copolymers of maleic anhydride with an unsaturated monomer, or those having an amino group containing silane coupling agent as a main component are preferable. There is a tendency for polyamide resin compositions having superior vibration fatigue characteristic improving effects to be obtained by employing such a sizing agent.

The copolymer of the above maleic anhydride and the unsaturated monomer is not particularly limited, and specific examples include copolymers of unsaturated monomers such as styrene, α-methyl styrene, butadiene, isoprene, chloroprene, 2,3-dichloro butadiene, 1,3-pentadiene, and cyclooctadiene, and maleic anhydride, copolymers of. Among these examples, a copolymer of butadiene, styrene, and maleic anhydride is preferable. These monomers may be employed singly or in combinations of two or more. In addition, a blend, which is utilized by mixing a copolymer of maleic anhydride and styrene and a copolymer of maleic anhydride and butadiene, may be employed as the sizing agent. It is preferable for the average molecular weight of the copolymer of the maleic anhydride and the unsaturated monomer to be 2,000 or greater. The ratio of the maleic anhydride to the unsaturated monomer is not particularly limited. The maleic anhydride copolymer may be used in combination with an acrylic acid copolymer or a urethane polymer.

The silane coupling agent is not particularly limited, and any silane coupling agent which is generally used for surface treatment of glass fibers may be utilized. The silane coupling agent is not particularly limited, and specific examples include aminosilane based coupling agents such as γ-aminopropyltrimethoxysilane, γ-aminopropyltriethoxysilane, N-β (aminoethyl) γ-aminopropyl methyl dimethoxy silane, N-β (aminoethyl) γ-aminopropyltrimethoxysilane, and N-β (aminoethyl) γ-aminopropyltriethoxysilane; epoxysilane based coupling agents such as γ-glycidoxypropylmethyldiethoxysilane, γ-glycidoxypropyltrimethoxysilane, and γ-glycidoxypropyltrimethoxysilane triethoxysilane; methacryloxy silane coupling agents such as γ-methacryloxypropyl methyl dimethoxy silane, γ-methacryloxypropyl trimethoxysilane, γ-methacryloxy propyl methyl diethoxy silane, and γ-methacryloxypropyl triethoxysilane; vinylsilane coupling agents such as vinyltrimethoxysilane, vinyltriethoxysilane, vinyl tris (β-methoxyethoxy silane, etc. Among these examples, aminosilane-based coupling agents having an affinity to polyamide resin are preferable, and γ-aminopropyltriethoxysilane and N-β (aminoethyl) γ-aminopropyltriethoxysilane are more preferable. These coupling agents may be used singly, or in combination of two or more.

((C) Copper Compound and Halide)

Examples of the copper compound used in the present disclosure include copper halide, copper acetate, copper propionate, copper benzoate, copper adipate, terephthalic acid copper, isophthalic acid copper, copper salicylate, nicotine acid copper, copper stearate, etc., as well as copper complex salts which are oriented in chelating agents such as ethylene diamine and ethylene diamine tetra acetic acid.

Copper iodide, bromide cuprous, cupric bromide, cuprous chloride, and copper acetate are preferable for use as the copper compound, from the viewpoints of superior heat aging resistance and suppression of metal corrosion of screws and cylinder portions during extrusion (hereinafter, also referred to simply as "metal corrosion"). Copper iodide and/or copper acetate are more preferable. One type of copper compound may be employed, or two or more types of copper compounds may be employed in combination.

With respect to the copper compound content, it is preferable for the concentration [Cu] of copper with respect to the (A) Polyamide 66 to be 40 ppm or greater and 300 ppm or less, more preferably 50 ppm or greater and 275 ppm or less, and even more preferably 60 ppm or greater and 250 ppm or less. It becomes possible to further suppress a decrease in the molecular weight during melt kneading, and there is a tendency for a polyimide resin composition having excellent mechanical properties to be obtained, by the content of the copper compound being within the above range.

Metal halides are preferable as the halide to be employed in the present disclosure, excluding copper halides. It is preferable for the halide to be at least one type of halide selected from a group consisting of Group I or Group II metal halides in the Periodic Table of the Elements. Examples of such metal halides include potassium iodide, potassium bromide, potassium chloride, sodium iodide, and sodium chloride. It is preferable for the halide to be potassium iodide or potassium bromide. A single type of halide or combinations of two or more types of halides may be employed.

With respect to the halide content, it is preferable for the concentration [X] of halogen with respect to the (A) Polyamide 66 to be 40 ppm or greater and 9000 ppm or less, more preferably 70 ppm or greater and 7000 ppm or less, and even more preferably 100 ppm or greater and 5000 ppm or less. It becomes possible to further suppress a decrease in the molecular weight during melt kneading, and there is a tendency for a polyamide resin composition having excellent mechanical properties to be obtained, by the content of the halide being within the above range.

In the case that the polyamide resin composition comprises 100 parts by mass of the (A) Polyamide 66 and 1 to 100 parts by mass of the (B), the combined total content of the copper compound and the halide is 0.005 to 1 part by mass. Heat resistance aging properties are improved, while copper precipitation and metal corrosion can be suppressed, by the content of the copper compound and the halide being within the above range.

In the polyamide resin composition of the present disclosure, it is preferable for the copper compound and the metal halide to be included such that the molar ratio (halogen/copper) of the halogen content and the copper content is within a range from 2/1 to 50/1. The molar ratio of the halogen content and the copper content is more preferably within a range from 2/1 to 40/1, and even more preferably a range from 4/1 to 30/1.

In the case that the molar ratio of the halogen content and the copper content is 2/1 or greater in the polyamide resin composition of the present disclosure, copper precipitation and metal corrosion can be suppressed, and therefore such molar ratios are preferable. In addition, in the case that the molar ratio of the halogen content and the copper content is 50/1 or less, problems such as corrosion of screws of a molding apparatus can be suppressed without losing mechanical properties such as toughness and rigidity.

Other components may be added to disperse the copper compound and the metal halide within the polyamide, to a degree that would not depart from the objective of the present disclosure.

Examples of such other components include higher fatty acids such as lauric acid as a lubricant, higher fatty acid metal salts with a higher fatty acid and a metal such as aluminum, higher fatty acid amides such as ethylene bis stearyl amide, and wax such as polyethylene wax. Further examples of such other components include organic compounds having at least one amide group.

(Other Components which may be Included in the Resin Composition)

In addition to the components described above, polyamides other than Polyamide 66 may be used in combination together with the (A) Polyamide 66. The polyamides other than the Polyamide 66 are not particularly limited, and examples thereof include: polycondensates of dicarboxylic acids and diamines, ring opening polymerization products of cyclic lactams, and polycondensation products of aminocarboxylic acids. Specific examples of such polyamides are not limited, and examples thereof include aliphatic polyamides such as polycaprolactam (Polyamide 6), polytetramethylene adipamide (Polyamide 46), polyhexamethylene sebacamide (Polyamide 610), polyhexamethylene dodecamide (Polyamide 612), polyundecamethylene adipamide (polyamide 116), polyundeca lactam (Polyamide 11), and poly dodecalactam (Polyamide 12); polyamides containing aromatic components such as polymethaxylene adipamide (Polyamide MXD6), polyhexamethylene terephthalamide (Polyamide 6T), polyhexamethylene isophthalamide (Polyamide 6I), poly nonamethylene terephthalamide (Polyamide 9T) and, polytetramethylene isophthalamide (polyamide 4I); and copolymers of the aliphatic polyamides with each other, copolymers of the polyamides containing aromatic components with each other, copolymers of the aliphatic polyamides and the polyamides containing aromatic components; and mixtures thereof. Among these examples, Polyamide 6, a copolymer of Polyamide 6 and Polyamide 66, and mixtures thereof are preferable from the viewpoint of compatibility with Polyamide 66.

Further, other components may be added as necessary. Such other components are not particularly limited, and examples thereof include: phenol based heat stabilizers, phosphorus based heat stabilizers, amine based heat stabilizers, sulfur based heat stabilizers, ultraviolet absorbers, light degradation preventing agents, plasticizers, lubricants, nucleating agents, mold release agents, flame retardants, pigments such as colorants and dyes and pigments, and other thermoplastic resins. Because the properties of each of such other components differ greatly different, the preferable content of each component varies. Those skilled in the art are capable of setting a suitable content for each of the other components mentioned above.

In the polyamide resin composition of the present disclosure, it is preferable for the standard deviation of tensile strength as measured according to ISO 527 to be 0.50 or less, more preferably 0.40 or less, and even more preferably 0.30 or less. Fluctuations among pellets will be reduced by the standard deviation of the tensile strength being 0.50 or less, and the generation of silver streaks will be suppressed in a molded article which is obtained, resulting in a superior outer appearance.

In the polyamide resin composition of the present disclosure, it is preferable for the standard deviation of tensile elongation of the polyamide resin composition of the present disclosure as measured according to ISO 527 to be 0.08 or less, and more preferably 0.07 or less. Fluctuations among pellets will be reduced by the standard deviation of the tensile elongation being 0.08 or less, and the generation of silver streaks will be suppressed in a molded article which is obtained, resulting in a superior outer appearance.

The tensile strength and tensile elongation can be measured by the methods described in the Examples.

[Method for Producing the Polyamide Resin Composition]

The polyamide resin composition of the present disclosure can be produced by blending the (A) Polyamide 66, the (B) glass fibers, and the (C) copper compound and halide, and setting the melt kneading temperature of a melt kneader within a specific range.

As the method for supplying the components that constitute the polyamide resin composition to the melt kneader, all of the components may be supplied simultaneously to the same supply port, or each of the components may be supplied through a different supply port.

Specific examples of blending methods include that in which the (A) Polyamide 66, the (B) glass fibers, and the (C) copper compound and halide are mixed employing a Henschel mixer or the like, after which the mixture is supplied to the melt kneader and kneaded, and that in which the (A) Polyamide 66 and the (C) copper compound and halide are mixed, the resin is melted by a single screw or twin screw extruder equipped with a pressure reducing device to achieve a molten state, and then the (B) glass fibers are blended from a side feeder.

In addition, as examples of a method for adding the (C) copper compound and halide to the (A) Polyamide 66, there is that in which the (C) copper compound and halide are added either singly as a mixture during the polymerization process of the (A) Polyamide 66, and that in which a melt kneader is employed to add the (C) copper compound and halide to the (A) Polyamide 66 either singly as a mixture.

The (C) copper compound and halide may be added as a solid, or added as an aqueous solution. The expression "during the polymerization process of the polyamide" refers to any step during the process from the raw material monomers to completion of polymerization.

The melt kneader is not particularly limited, and a known melt kneading apparatus such as a single screw or a twin screw extruder, a Banbury mixer, and a mixing roll may be employed. Among these known apparatuses, the twin-screw extruder is preferable. The melt kneading temperature is important in order for the molecular weight of the (A) Polyamide 66 within the resin composition to be in the specific range, and a melt kneading temperature within an approximate range from 280° C. to 350° C. is preferable. Here, the expression "melt-kneading temperature" refers to the set heating temperature of a container while melt kneading the constituent components. In the case that the molecular weight of the (A) Polyamide 66 resin is high and the average fiber diameter of the (B) glass fibers is small, there is a tendency for the resin temperature to become high during melt kneading. Therefore, it is preferable for the melt kneading temperature to be 330° C. or less.

In the case that a twin screw extruder is employed, it is preferable to produce the polyamide resin composition of the present disclosure by the following production method.

A production method comprising a step (1-1) of melt kneading the (A) Polyamide 66 and the (C) copper compound and halide at a melt kneading temperature of 300° C. or greater and 330° C. or less, and a step (1-2) of adding the (B) glass fibers to the kneaded product obtained in step (1-1) and continuing melt kneading.

In a normal operating mode of a twin screw extruder, in which the temperature of a container (barrel) is maintained to a set heating temperature, the temperature of the barrel is controlled within a range of ±5° C. of the set heating temperature.

Note that the die head of the extruder may be set as appropriate according to the resin temperature of the obtained resin composition.

In step (1-2), it is preferable for the (B) glass fibers to be added to the kneaded product obtained in step (1-1), and for the mixture to be melt kneaded at a melt kneading temperature within a range from 280° C. to 350° C., and more preferably a range from 280° C. to 300° C.

By melt kneading (A) polyamide 66 and the (C) copper compound within the above temperature range and adding the (B) component thereafter, the amount of the high molecular weight component within the (A) Polyamide 66, which is effective in improving long term properties, can be maintained during the melt kneading, and the operating stability of the twin screw extruder can be improved.

[Polyamide Resin Composition Pellet Group]

A polyamide resin composition pellets group of the present disclosure is produced by the method of production described above. Thereby, resin temperature is prevented from becoming high during melt kneading, and foaming is suppressed.

It is preferable for the standard deviation of tensile strength of the pellet group as measured according to ISO 527 to be 0.50 or less, and more preferably 0.40 or less. Fluctuations among pellets will be reduced by the standard deviation of the tensile strength being 0.50 or less, and the generation of silver streaks will be suppressed in a molded article which is obtained, resulting in a superior outer appearance.

Here, the expression "pellet group" means a collection of pellets, and generally refers to pellets which are provided in receptacles such as containers and paper bags.

It is preferable for the standard deviation of tensile elongation of the pellet group as measured according to ISO 527 to be 0.08 or less, and more preferably 0.07 or less. Fluctuations among pellets will be reduced by the standard deviation of the tensile elongation being 0.08 or less, and the generation of silver streaks will be suppressed in a molded article which is obtained, resulting in a superior outer appearance.

The tensile strength and tensile elongation can be measured by the methods described in the Examples.

[Molded Article]

A molded article of the present disclosure is produced by molding the polyamide resin composition of the present disclosure described above. For example, the molded article can be obtained by injection molding the polyamide resin composition of the present disclosure.

The molded article of the present disclosure has a small amount of foam and has superior mechanical properties. Therefore, the molded article of the present disclosure may be favorably utilized as a variety of products, such as those for automobiles, industrial machinery, electric/electronics, residential installations, industrial materials, engineering materials, and daily/household goods, as well as parts thereof.

Specific applications of the polyamide resin composition of the present disclosure include: air intake manifolds, intercooler inlets, exhaust pipe covers, inner bushings, bearing retainers, engine mounts, engine head covers, resonators; parts for automobile engine rooms such as throttle bodies, chain covers, thermostat housings, outlet pipes, radiator tanks, alternators, and delivery pipes; gears and cams for power steering assemblies; and sliding parts such as bearings.

EXAMPLES

Hereinafter, Examples and Comparative Examples of the present disclosure will be described in greater detail. However, the present disclosure is not limited to these Examples. The measuring methods, the evaluation methods, and the raw materials which are employed in the Examples and Comparative Examples are indicated below.

[Raw Materials]
(A) Polyamide 66
(a-1): Polyamide 66 of Production Example 1 below with a relative viscosity RV of 130
(a-2): Polyamide 66 of Production Example 2 below with a relative viscosity RV of 45
(B) Glass Fibers
(b-1): Glass fibers (hereinafter abbreviated as "GF") with an average glass fiber diameter of 7 µm and an average glass fiber length of 3 mm (product name "ECS301HP (E)" by CPIC)
(B-2): GF with an average glass fiber diameter of 13 µm, and an average glass fiber length of 3 mm (product name "ECS301HP (K)" by CPIC)
(C) Copper Compound and Halide
(C-1) Copper compound: copper iodide (CuI) (product name "copper iodide (I)" by Wako Pure Chemical Industries)
(C-2) Halide: potassium iodide (KI) (product name "potassium iodide" by Wako Pure Chemical Industries)
[Measuring Method]
<Relative Viscosity RV>

The relative viscosities RV of the Polyamide 66 (a-1 and a-2) were measured according to ASTMD789. Specifically, 90% formic acid was employed as solvent and measurements were performed for a concentration of 3 g sample/30 ml formic acid at a temperature of 25° C.

<Molecular Weight>

Quantification of the component having a molecular weight of 30,000 or less and the component having a molecular weight of 100,000 or more components were measured by GPC as follows.
Apparatus: "HLC-8320GPC" by Tosoh
Detector: differential refractometer (RI)
Solvent: hexafluoroisopropanol (HFIP) with 0.1 mol % of dissolved sodium trifluoroacetate
Column: two "TSKgel-GMHHR-M" by Tosoh and one "G1000HHR" by Tosoh were utilized connected in series, and calculated by polymethyl methacrylate (PMMA) based on the obtained elution curve.

[Evaluation Methods]

<Tensile Strength>

An injection molding apparatus ("PS-40E" by Nissei Plastic Industrial) was employed to mold 4 mm thick ISO molded pieces using the pellets of the polyamide resin compositions obtained in the Examples and Comparative Examples. The injection time and pressure holding time were set to 25 seconds, the cooling time was set to 15 seconds, the mold temperature was set to 80° C., and the molten resin temperature was set to 290° C. The obtained molded pieces were subjected to tensile tests at a pulling rate of 5 mm/minute according to ISO 527, to measure the tensile strength and the tensile elongation. At this time, standard deviations were calculated from the values of ten test pieces.

<Charpy Impact Strength>

The 4 mm thick ISO molded pieces obtained as described above were cut into test pieces having a length of 80 mm, a width of 10 mm, and a thickness of 4 mm. The impact strength of the test pieces was measured by the Charpy V notch impact test according to ISO 179/1eA.

<Coefficient of Friction and Wear Depth>

An injection molding apparatus ("FN-3000" with a screw diameter of 40 mm by Nissei Plastic Industrial) was employed to mold plates having a width of 80 mm, a length of 120 mm, and a thickness of 8 mm from the Polyamide 66 resin composition pellets. The molding conditions were as follows: a cylinder temperature of 290° C., a mold temperature of 80° C., an injection pressure of 65 MPa, an injection time of 15 seconds, a cooling time of 15 seconds, and a screw rotation speed of 200 rpm. Cutting was performed from the centers of the plates in a direction perpendicular to the molding flow direction, to obtain test pieces having a width of 8 mm, a length of 80 mm, and a thickness of 4 mm.

The coefficient of friction of the test pieces obtained in this manner was measured employing an "AFT-15MS" reciprocating friction wear tester by Toyo Semitsu. The measurement conditions were as follows: a load of 1 kg, a linear velocity of 50 mm/sec, a reciprocating distance of 20 mm, an ambient temperature of 23° C., an ambient humidity of 50%, and 5000 reciprocations. In addition, the wear depth of the test pieces after testing was measured using a "SUR-FCOM" surface roughness measuring apparatus by Tokyo Seimitsu. The greatest value from among three measurement points was designated as the wear depth. The mating material used for the sliding property evaluation of the test pieces was a SUS (Steel Use Stainless) 304 test piece (a sphere with a diameter of 5 mm).

<Foaming within Pellets>

1 kg batches of pellets of the polyamide resin composition in the Examples and Comparative Examples were weighed, then the states of foaming within the pellets were visually observed and evaluated based on the criteria below.

Good: the number of foamed pellets is 0 or more and less than 10

Fair: the number of foamed pellets is 10 or more and less than 20

Poor: the number of foamed pellets is 20 or more

<Outer Appearance>

Strips having thicknesses of 2 mm were obtained employing an injection molding apparatus ("PS-40E" by Nissei Plastic industrial). The injection molding conditions were set as follows: a cylinder temperature of 290° C., a mold temperature of 80° C., an injection time of 7 seconds, and a cooling time of 12 seconds. The presence or absence of silver streaks generation on the surfaces of the strips was visually observed and evaluated based on the criteria below.

Good: no generation of silver streaks

Poor: generation of silver streaks is observed

<Fluctuations in Torque>

When the polyamide resin compositions of the Examples and Comparative Examples are produced by a twin screw extruder, fluctuations in torque of the extruder during a time period of 15 minutes were evaluated based on the criteria below.

Good: fluctuation range of the torque is 0% or greater and 4% or less

Fair: the fluctuation range of the torque is 4% or greater and 6% or less

Poor: the fluctuation range of the torque is 6% or greater (A) Production Examples of Polyamide 66

[Production Example 1] Production of a-1

15 kg of an aqueous solution containing 50 parts by mass of an equimolar salt of hexamethylenediamine and adipic acid was prepared. Then the aqueous solution was set within an autoclave having a volume of 40 L, a stirrer, and a discharge nozzle at the bottom thereof, and stirred sufficiently at 50° C. The interior of the autoclave was sufficiently substituted with nitrogen, and the temperature within the autoclave was increased from 50° C. to approximately 270° C. while stifling the aqueous solution. At this time, the pressure within the autoclave was approximately 1.8 MPa (G) in gauge pressure, and water was discharged as necessary such that the pressure did not exceed 1.8 MPa (G). In addition, the polymerization time was adjusted such that the relative viscosity of the Polyamide 66 (RV, measured by a method according to ASTMD789) was approximately 45. After completion of polymerization in the autoclave, the polyamide 66 was fed out from the bottom nozzle as a strand, and Polyamide 66 in pellet form was obtained after water-cooling and cutting.

This polyamide 66 resin was introduced into a 10000 L solid phase polymerization apparatus, and sufficient nitrogen substitution was performed. Thereafter, solid phase polymerization was performed for a predetermined amount of time with the internal temperature of the apparatus set within a range from 180° C. to 190° C. and nitrogen flowing at 500 L/minute, to obtain Polyamide 66 with a relative viscosity RV of 130, as (a-1).

[Production Example 2] Production of a-2

15 kg of an aqueous solution containing 50 parts by mass of an equimolar salt of hexamethylenediamine and adipic acid was prepared. Then the aqueous solution was set within an autoclave having a volume of 40 L, a stirrer, and a discharge nozzle at the bottom thereof, and stirred sufficiently at 50° C. The interior of the autoclave was sufficiently substituted with nitrogen, and the temperature within the autoclave was increased from 50° C. to approximately 270° C. while stirring the aqueous solution. At this time, the pressure within the autoclave was approximately 1.8 MPa (G) in gauge pressure, and water was discharged as necessary such that the pressure did not exceed 1.8 MPa ((1). In addition, the polymerization time was adjusted such that the relative viscosity of the Polyamide 66 (RV, measured by a method according to ASTMD789) was approximately 45. After completion of polymerization in the autoclave, the polyamide 66 was fed out from the bottom nozzle as a strand, and Polyamide 66 in pellet form was obtained after water-cooling and cutting as (a-2).

Examples 1-4, Comparative Examples 1-3

A twin screw extruder ("ZSK-40MC" by Coperion (Germany)) having an upstream side supply port provided on the first barrel at the upstream side of the extruder, a downstream side supply port, and an L/D (Length of the cylinder of the extruder/Diameter of the cylinder of the extruder) of 48 (number of barrels: 12) was employed. In the above twin screw extruder, the temperatures of the barrel having the upstream side supply port through a barrel before the barrel having the downstream side supply port (number of barrels: 7) were set to be within a range from 310° C. to 320° C. The temperatures of the barrel having the downstream side supply port through the last barrel (number of barrels: 5) were set to 290° C. The screw rotating speed was set to 200 rpm, the degree of reduced pressure was set to −0.08 MPa, and the discharge rate was set to 80 kg/hour.

Under these conditions, (A) Polyamide 66 and (C) copper compound and halide were supplied through the upstream supply port and (B) glass fibers were supplied through the downstream supply port such that the percentages of the contents of each component became those shown in Table 1 below. Then, the resin compositions underwent melt kneading to produce pellets of the resin compositions. The molecular weights and foaming in pellets were evaluated employing the obtained pellets. In addition, the obtained resin compositions were molded at a resin temperature of 290° C. and a mold temperature of 80° C., and various physical properties were evaluated. The evaluation results are also shown in Table 1 below.

Example 5

Pellets of a resin composition of Example 5 were produced by melt kneading in the same manner as Example 1, except that (b-2) was employed as the (B) glass fibers.

Comparative Example 4

Melt kneading was performed in the same manner as Example 1 except that the temperatures of all of the barrels of the twin screw extruder were set to 290° C. and the percentages of the content of each component were as shown in Table 1. The torque of the extruder approached the upper limit thereof, and therefore this resin composition was judged to be that for which extrusion is not possible.

Comparative Examples 5 and 6

Pellets of resin compositions of Comparative Examples 5 and 6 were produced by melt kneading in the same manner as Example 1, except that the temperatures of all of the barrels of the twin screw extruder were set to 290° C., the discharge rate was set to 40 kg/hour, and the percentages of the content of each component were as shown in Table 1.

Comparative Example 7

Pellets of a resin composition of Comparative Example 7 were produced by melt kneading in the same manner as Comparative Example 3, except that (b-2) was employed as the (B) glass fibers.

| | | | Example 1 | Example 2 | Example 3 | Example 4 | Example 5 | Comparative Example 1 | Comparative Example 2 |
|---|---|---|---|---|---|---|---|---|---|
| (A) Polyamide 66 | Type | — | a-1 | a-1 | a-1 | a-1 | a-1 | a-1 | a-1 |
| | Content | Parts by Mass | 70 | 60 | 80 | 85 | 70 | 90 | 100 |
| | Type | — | a-2 | a-2 | a-2 | a-2 | a-2 | a-2 | |
| | Content | Parts by Mass | 30 | 40 | 20 | 15 | 30 | 10 | |
| (B) Glass Fibers | Type | — | b-1 | b-1 | b-1 | b-1 | b-2 | b-1 | b-1 |
| | Content | Parts by Mass | 34 | 34 | 34 | 34 | 34 | 34 | 34 |
| (C-1) Copper Compound | Content | Parts by Mass | 0.03 | 0.03 | 0.03 | 0.03 | 0.03 | 0.03 | 0.03 |
| (C-2) Halide | Content | Parts by Mass | 0.3 | 0.3 | 0.3 | 0.3 | 0.3 | 0.3 | 0.3 |
| Physical Properties | Percentage of Components having molecular weights of 30,000 or less in (A) | wt % | 35 | 36 | 35 | 36 | 33 | 38 | 38 |
| | Percentage of Components having moleculra weights of 100,000 or greater within (A) | wt % | 14 | 13 | 14 | 15 | 15 | 15 | 15 |
| | Tensile Strength | MPa | 189 | 189 | 188 | 188 | 182 | 187 | 187 |
| | Standard Deviation | — | 0.13 | 0.14 | 0.13 | 0.31 | 0.15 | 0.81 | 0.87 |
| | Tensile Elongation | % | 5.0 | 5.0 | 5.0 | 5.0 | 4.3 | 4.8 | 4.8 |
| | Standard Deviation | — | 0.06 | 0.06 | 0.07 | 0.09 | 0.08 | 0.12 | 0.11 |
| | Charpy | kJ/m$^2$ | 11.5 | 11.5 | 11.4 | 11.2 | 10.9 | 10.7 | 10.3 |
| | Cofficient of Friction | — | 0.85 | 0.86 | 0.85 | 0.86 | 0.94 | 0.86 | 0.87 |
| | Wear Depth | μm | 11.4 | 11.5 | 11.2 | 11.3 | 12.9 | 11.4 | 11.5 |
| | Foaming in Pellets | — | Good | Good | Good | Fair | Good | Poor | Poor |
| | Outer Appearance | — | Good | Good | Good | Good | Good | Poor | Poor |
| | Fluctuation in Torque | — | Good | Good | Good | Fair | Good | Poor | Poor |
| | | | Comparative Example 3 | Comparative Example 4 | Comparative Example 5 | Comparative Example 6 | Comparative Example 7 | | |
| (A) Polyamide 66 | Type | — | a-1 | a-1 | a-1 | a-1 | a-1 | | |
| | Content | Parts by Mass | 30 | 80 | 80 | 60 | 30 | | |
| | Type | — | a-2 | a-2 | a-2 | a-2 | a-2 | | |
| | Content | Parts by Mass | 70 | 20 | 20 | 40 | 70 | | |
| (B) Glass Fibers | Type | — | b-1 | b-1 | b-1 | b-1 | b-2 | | |
| | Content | Parts by Mass | 34 | 34 | 34 | 34 | 34 | | |

-continued

| | | | | | | | |
|---|---|---|---|---|---|---|---|
| (C-1) Copper Compound | Content | Parts by Mass | 0.03 | 0.03 | 0.03 | 0.03 | 0.03 |
| (C-2) Halide | Content | Parts by Mass | 0.3 | 0.3 | 0.3 | 0.3 | 0.3 |
| Physical Properties | Percentage of Components having molecular weights of 30,000 or less in (A) | wt % | 42 | Extrusion Not Possible | 38 | 38 | 40 |
| | Percentage of Components having moleculra weights of 100,000 or greater within (A) | wt % | 9 | | 13 | 13 | 10 |
| | Tensile Strength | MPa | 184 | | 188 | 188 | 177 |
| | Standard Deviation | — | 0.15 | | 0.83 | 0.79 | 0.15 |
| | Tensile Elongation | % | 4.7 | | 4.9 | 4.9 | 4.1 |
| | Standard Deviation | — | 0.06 | | 0.13 | 0.12 | 0.06 |
| | Charpy | kJ/m$^2$ | 11.1 | | 10.9 | 11.2 | 10.3 |
| | Cofficient of Friction | — | 0.96 | | 0.85 | 0.85 | 0.97 |
| | Wear Depth | μm | 13.2 | | 11.4 | 11.4 | 13.3 |
| | Foaming in Pellets | — | Good | | Poor | Poor | Good |
| | Outer Appearance | — | Good | | Poor | Poor | Good |
| | Fluctuation in Torque | — | Fair | | Fair | Fair | Good |

From Table 1, it was understood that polyamide resin compositions comprising: (A) Polyamide 66; (B) glass fibers; and (C) a copper compound and a halide; in which the percentage of a component of the (A) Polyamide 66 having a molecular weight of 30,000 or less as obtained by Gel Permeation Chromatography (GPC) is within a range from 30% by mass to 37% by mass of the total amount of the (A) Polyamide 66, and the percentage of the (A) Polyamide 66 having a molecular weight of 100,000 or greater is within a range from 8% by mass to 15% by mass of the total amount of the (A) Polyamide 66 have superior mechanical strength and suppress foaming in pellets. In addition, fluctuations in torque of the extruder are suppressed and productivity is superior.

INDUSTRIAL APPLICABILITY

The resin composition of the present disclosure has industrial applicability with respect to molded articles that require high level outer appearances, such as automobile parts.

The invention claimed is:

1. A polyamide resin composition comprising:
   (A) polyamide 66;
   (B) glass fibers; and
   (C) a copper compound and a halide;
   wherein a percentage of a component of the (A) polyamide 66 having a molecular weight of 30,000 or less as obtained by gas permeation chromatography (GPC) is within a range from 30% by mass to 37% by mass of the total amount of the (A) polyamide 66, and a percentage of a component of the (A) polyamide 66 having a molecular weight of 100,000 or greater is within a range from 8% by mass to 15% by mass of the total amount of the (A) polyamide 66.

2. A polyamide resin composition as defined in claim 1, wherein:
   an average fiber diameter of the (B) glass fibers is within a range from 5 μm to 9 μm.

3. A polyamide resin composition as defined in claim 1, wherein:
   the (A) polyamide 66 includes at least one type of polyamide 66 (A-1) having a relative viscosity RV of 65 or greater and 250 or less, and at least one type of polyamide 66 (A-2) having a relative viscosity RV of 25 or greater and less than 65.

4. A polyamide resin composition as defined in claim 3, wherein:
   the mass ratio (A-1)/(A-2) of polyamide 66 (A-1) and polyamide 66 (A-2) is within a range from 85/15 to 50/50.

5. A polyamide resin composition as defined in claim 1, wherein:
   the polyamide resin composition comprises 100 parts by mass of the (A) polyamide 66, 1 to 100 parts by mass of the (B) glass fibers, and 0.005 to 1 part by mass of the (C) copper compound and halide.

6. A polyamide resin composition as defined in claim 1, wherein:
   a concentration [Cu] of copper with respect to the (A) polyamide 66 is 40 ppm or greater and 300 ppm or less.

7. A polyamide resin composition as defined in claim 6, wherein:
   a molar ratio (halogen/copper) of a halogen content and a copper content is within a range from 2/1 to 50/1.

8. A polyamide resin composition as defined in claim 1, wherein:
   a concentration of halogen with respect to the (A) polyamide 66 is 40 ppm or greater and 9000 ppm or less.

9. A polyamide resin composition as defined in claim 8, wherein:
   a molar ratio (halogen/copper) of a halogen content and a copper content is within a range from 2/1 to 50/1.

10. A polyamide resin composition as defined in claim 1, wherein:
    a standard deviation of tensile strength as measured according to ISO 527 is 0.50 or less.

11. A polyamide resin composition as defined in claim 1, wherein:
    a standard deviation of tensile elongation as measured according to ISO 527 is 0.08 or less.

12. A polyamide resin composition pellet group comprising pellets of the polyamide resin composition as defined in claim 1, wherein:
    a standard deviation of the tensile strength as measured according to ISO 527 is 0.50 or less.

13. A polyamide resin composition pellet group as defined in claim 12, wherein:
    a mean fiber diameter of the glass fibers is within a range from 5 μm to 9 μm.

14. A polyamide resin composition pellet group as defined in claim 12, wherein:

a standard deviation of the tensile elongation as measured according to ISO 527 is 0.08 or less.

15. A method for producing a polyamide resin composition as defined in claim 1, comprising:

(1-1) melting and kneading (A) polyamide 66 and (C) a copper compound and a halide at a melt kneading temperature of 300° C. or greater and 330° C. or less to obtain a kneaded product; and (1-2) adding (B) glass fibers to the kneaded product obtained by step (1-1) and performing further melt kneading.

16. A molded article obtained by molding a polyamide resin composition as defined in claim 1.

* * * * *